United States Patent [19]
North

[11] Patent Number: 6,098,395
[45] Date of Patent: Aug. 8, 2000

[54] CLOSED-LOOP AIR COOLING SYSTEM FOR A TURBINE ENGINE

[75] Inventor: William Edward North, Winter Springs, Fla.

[73] Assignee: Siemens Westinghouse Power Corporation, Orlando, Fla.

[21] Appl. No.: 08/627,561

[22] Filed: Apr. 4, 1996

[51] Int. Cl.[7] .................................................. F02C 7/18
[52] U.S. Cl. ..................................... 60/39.02; 60/39.75
[58] Field of Search ............................... 60/39.02, 39.07, 60/39.17, 39.75

[56] References Cited

U.S. PATENT DOCUMENTS

| | | |
|---|---|---|
| 2,445,837 | 7/1948 | McKenzie, Jr. . |
| 2,618,120 | 11/1952 | Papini . |
| 2,654,220 | 10/1953 | Boestad et al. . |
| 2,940,257 | 6/1960 | Eckert et al. . |
| 3,751,909 | 8/1973 | Kohler ................................. 60/39.17 |
| 5,134,844 | 8/1992 | Lee et al. ............................. 60/39.75 |
| 5,394,687 | 3/1995 | Chen et al. . |
| 5,611,197 | 3/1997 | Bunker . |

Primary Examiner—Louis J. Casaregola
Attorney, Agent, or Firm—Eckert Seamans Cherin & Mellott, LLC

[57] ABSTRACT

Method and apparatus are disclosed for providing a closed-loop air cooling system for a turbine engine. The method and apparatus provide for bleeding pressurized air from a gas turbine engine compressor for use in cooling the turbine components. The compressed air is cascaded through the various stages of the turbine. At each stage a portion of the compressed air is returned to the compressor where useful work is recovered.

20 Claims, 3 Drawing Sheets

CLOSED-LOOP AIR COOLING SYSTEM FOR A TURBINE ENGINE

GOVERNMENT INTEREST

This invention was made with government support under a Contract DE-AC21-94MC30247 awarded by the Department of Energy. The government has certain rights in this invention.

FIELD OF THE INVENTION

The invention relates to cooling systems for use with turbine engines. More particularly, the invention relates to closed-loop cooling systems for returning air to the compressor cycle of a gas turbine engine after its use as a coolant in the combustion cycle.

BACKGROUND OF THE INVENTION

Current gas turbine engines have peak temperatures in the combustor approaching 3000° F., yet alloys used to construct the turbine engines have melting points in the range of 2200 to 2400° F. Consequently, ample cooling of the turbine engine components is required. Both open-loop and closed loop cooling systems have been developed to provide turbine engine cooling needs.

Both types of systems commonly use pressurized air as a cooling medium. High pressure air provides better heat transfer characteristics than low pressure air as well as providing leakage or film cooling of turbine components. In open-loop cooling systems, spent cooling air passes through the cooled component and into the hot gas path. To pass out through the component, the cooling air must have sufficient pressure to overcome the pressure within the path. Additionally, the pressurization is required for leakage supply, so that air can escape from the component while preventing the hot gas from entering the component. As a result of the need to overcome the surrounding pressure, components closer to the combustor, which experience higher pressures and hotter temperatures, require higher pressure cooling air. Conversely, components further from the combustor require less pressure.

According to conventional air cooling systems, the pressurized air requirements are met by bleeding air out of the compressor stages and feeding that air to the turbine stages. After use in cooling, the spent cooling air combines with the main turbine gas flow and exits the turbine through the exhaust system. To minimize the thermodynamic penalty, open-loop cooling systems remove the air from the lowest possible compression point. An exemplary turbine employing such an open loop system is described in Scalzo et al., *A New 150 MW High Efficiency Heavy-Duty Combustion Turbine*, ASME Paper No.88-GT-162 (1988). Significantly, in open-loop air cooling systems, spent cooling air is bled into the gas path where it passes out of the turbine engine with the exhaust. Such a design is inefficient because the spent cooling air dilutes the main gas flow thus performing less useful work than it would have had it been heated in the combustion process.

Closed-loop cooling systems have been proposed that use an external compressor to provide the necessary pressure to circulate the coolant and to generate the required heat transfer characteristics. In such a system, air circulates out of the turbine after providing the cooling and is recompressed before being injected directly into the combustor. However, this type of closed-loop cooling system requires expensive external compressors. Applicants have recognized that more efficiency can be gained if the external compressors can be eliminated.

Thus, there is a need for a closed-loop cooling system for use in a turbine engine that recovers the compressed air after it has been used in cooling without the need for external compressors.

SUMMARY OF THE INVENTION

The present invention meets the needs above by providing closed-loop air cooling to each turbine stage by bleeding pressurized air from the compressor and providing the air to the turbine. After the pressurized air has removed heat from each turbine stage, it is routed out and cooled to a predetermined temperature. Next, a first portion of the pressurized air is routed into the next stage of the turbine. A second portion of the pressurized air is routed back to the compressor. This procedure is repeated for each turbine stage.

BRIEF DESCRIPTION OF THE DRAWINGS

The foregoing summary, as well as the following detailed description of the preferred embodiment, is better understood when read in conjunction with the appended drawings. For the purpose of illustrating the invention, there is shown in the drawings an embodiment that is presently preferred, it being understood, however, that the invention is not limited to the specific methods and instrumentalities disclosed.

In the drawings.

DETAILED DESCRIPTION OF A PREFERRED EMBODIMENT

Figure 1:
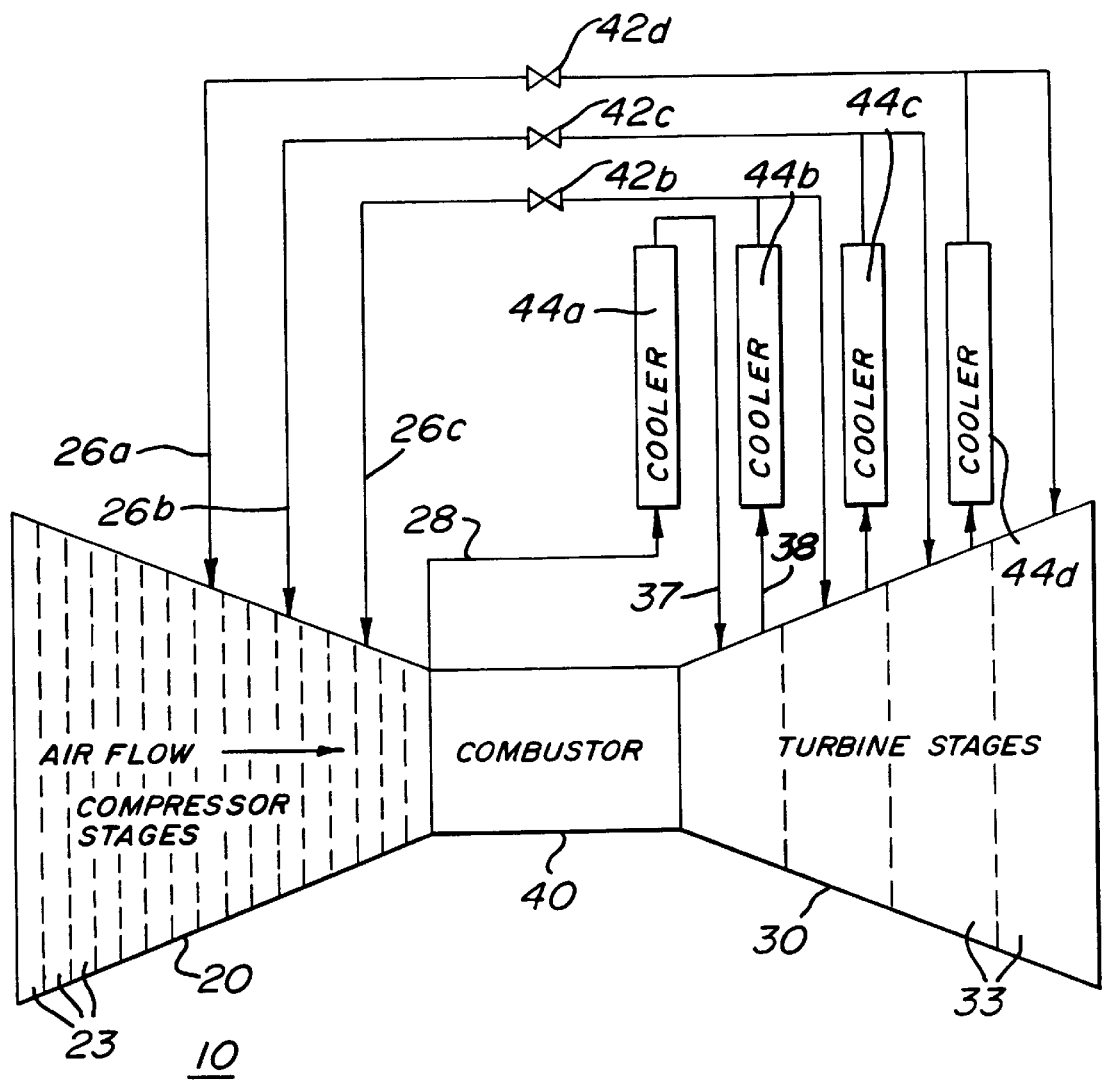
FIG. 1 is a schematic depiction of a gas turbine engine using a closed-loop system in accordance with the present invention.

Referring now to the drawings wherein like numerals indicate like elements throughout, FIG. 1 presents a diagram of an exemplary turbine engine 10 employing a closed-loop cooling system according to the present invention. Significantly, the present invention could be adapted to a turbine engine 10 with any number of compressor and turbine stages. However, for purposes of illustration, FIG. 1 demonstrates the present invention adapted for use in a turbine engine 10 having sixteen compressor stages 23 and four turbine stages 33. For clarity, each compressor and turbine stage is depicted in FIG. 1 as a set of dashed lines. As is better depicted in FIGS. 2 and 3, each compressor stage 23 and turbine stage 33 comprises a set of vanes 21, 31 and blades 22, 32.

As in all conventional turbine engines, air flows axially through the turbine engine 10 depicted in FIG. 1. Initially, the air flows in through the multiple stages of the compressor 20, with each stage further compressing the air. After the final compressor stage 23, the air reaches the compressor discharge point. There, the compressed air enters the combustor 40 and mixes with fuel. The air and fuel mixture is then fired and expands outward through the multiple stages of the turbine 30. The hot gas expanding out through the turbine 30 generates intense heat in the components (e.g., vanes and blades) in the gas path.

According to an aspect of the present invention, a more efficient cooling system is attained by bleeding air out of the compressor 20 before it reaches the combustor 40, using that bleed air to cool the components within the turbine 30 and then returning the bleed air to the compressor 20. According to the presently preferred embodiment, the air is bled from the compressor 20 at the discharge point, i.e., just before entry into the combustor 40. Before use in cooling, this compressor discharge air is directed out of the turbine engine 10, cooled and filtered. Then, it is returned to the turbine engine 10 to be cascaded through each of the four stages in the turbine 30. During the cascading through the stages of the turbine 30, the air enters each stage, removes heat from components then exits, where the pressurized air is once again cooled before cascading to the next stage of the turbine 30. After each stage, a portion of the pressurized air is returned to the compressor 20 and a portion of the pressurized air advances to the next stage. Each subsequent stage of the turbine 30 demands less pressure than the previous stage as the pressure and temperature decreases within each stage. To maximize air pressure recovery and, thus efficiency, the pressure demands flowing to the next stage of the turbine 30 are regulated such that substantially the minimal necessary pressure is provided. Excess pressurized air is returned to the compressor 20, where useful energy is recovered.

Further details of the current invention will now be described with respect to an exemplary turbine engine 10. Those details are for illustration purposes only, as the present invention is equally applicable to other turbine engines. Thus, all references to temperatures, pressures, stages and the like will vary according to the specifics of a particular turbine engine.

As described above, the turbine engine 10 depicted in FIG. 1 comprises sixteen compressor stages 23. According to the presently preferred embodiment, after intake air has passed sixteen compressor stages, a portion of the compressed air will be bled out at the compressor discharge point as indicated by line 28. This pressurized air will have a predetermined pressure (e.g., 350 PSI) and temperature (e.g., 1000° F.). To enhance the pressurized air's cooling capability, it is routed through cooler 44a. Note that cooler 44a is optional. It is possible to cool the stage one turbine without the cooler 44a. However, the subsequent coolers 44 are required. The air exiting cooler 44a has a desired temperature, e.g., approximately 300° F., determined to provide satisfactory cooling of the turbine components. Similarly, at each subsequent stage of turbine cooling, the air is similarly routed through a cooler 44. The coolers 44 are of a type well-known in the art, such as air-to-air, air-to-steam or air-water. Therefore, the details of such coolers 44 are left out of the present description for brevity and clarity.

Figure 2:
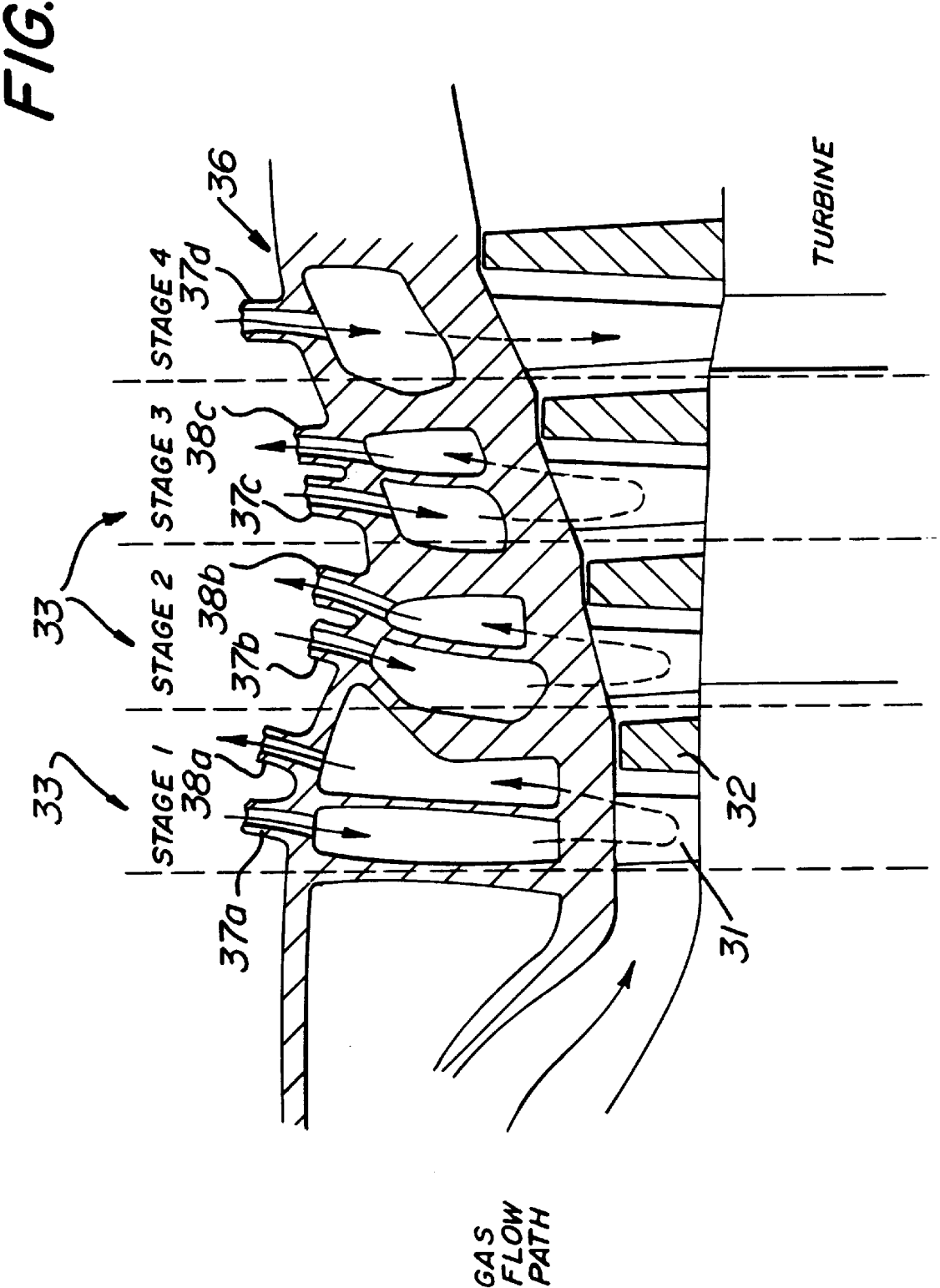
FIG. 2 is a sectional view of a cooling circuit through the turbine stages of the turbine engine.

The air exiting the first cooler 44a is routed via line 37 into the first stage of turbine 30, where it enters the turbine cooling circuit illustrated in FIG. 2. The section of turbine 30 shown has four turbine stages 33. Following the flow of cooling air through the cooling circuit, the cooling air first enters the turbine 30 at stage one via conduit 37a. The cooling air then enters the manifold via an air inlet and flows through the manifold 36 and into the first stage components, e.g., vane 31. Heat is removed from the components according to well-known techniques such as impingement or internal convection cooling. Significantly, the air flows into and out of the components then travels back through the manifold 36 and out via an air outlet in flow communication with conduit 38a. After the air has exited stage one of the turbine 30, it flows through cooler 44b before use in the next stage of the turbine 30.

After the air exits cooler 44, a portion of the pressurized air will flow on to the next stage of the turbine 30. However, according to the present invention, subsequent stages may not require all of the pressurized air exiting the previous stages. Thus, a portion of the air is shunted back to the compressor 20. The shunting of air back to the compressor 20 is regulated by control valve 42.

According to the presently preferred embodiments, control valve 42 may be either pressure or temperature sensitive. In the case of pressure sensitivity, the valve 42 will regulate the pressure in the next turbine stage 33 to maintain a predetermined level. Any remaining air will be allowed to flow through the valve 42 and will be injected back into the compressor 20. Thus, the control valve 42 will properly react to changing ambient conditions, such as changes in ambient temperature and pressure, to maintain the required pressure within the turbine cooling circuit.

Alternatively, the control valve 42 may be temperature sensitive. In such a case, a thermocouple (not shown) embedded in the next turbine stage 33 will provide temperature information to the control valve. As a result, the control valve 42 will adjust the pressure accordingly to maintain a preset temperature.

As noted above, each subsequent stage of turbine 30, requires less pressure than the preceding stage. Consequently, the pressure of the air returned to the compressor 20 continually decreases and must be injected into the compressor 20 at different stages. For example, the air pressure returned to the compressor via valve 42b may be approximately 200 PSI, while the air pressure returned to the compressor 20 via valve 42c will be approximately 125 PSI, and the air pressure returned via valve 42d will be approximately 75 PSI. Thus, as best illustrated in FIG. 1, return air from stage one of the turbine 30 flows to stage fourteen in the compressor 20, stage two of the turbine 30 flows to stage eleven in the compressor 20 and stage three of the turbine 30 flows to stage eight of the compressor 20.

Figure 3:
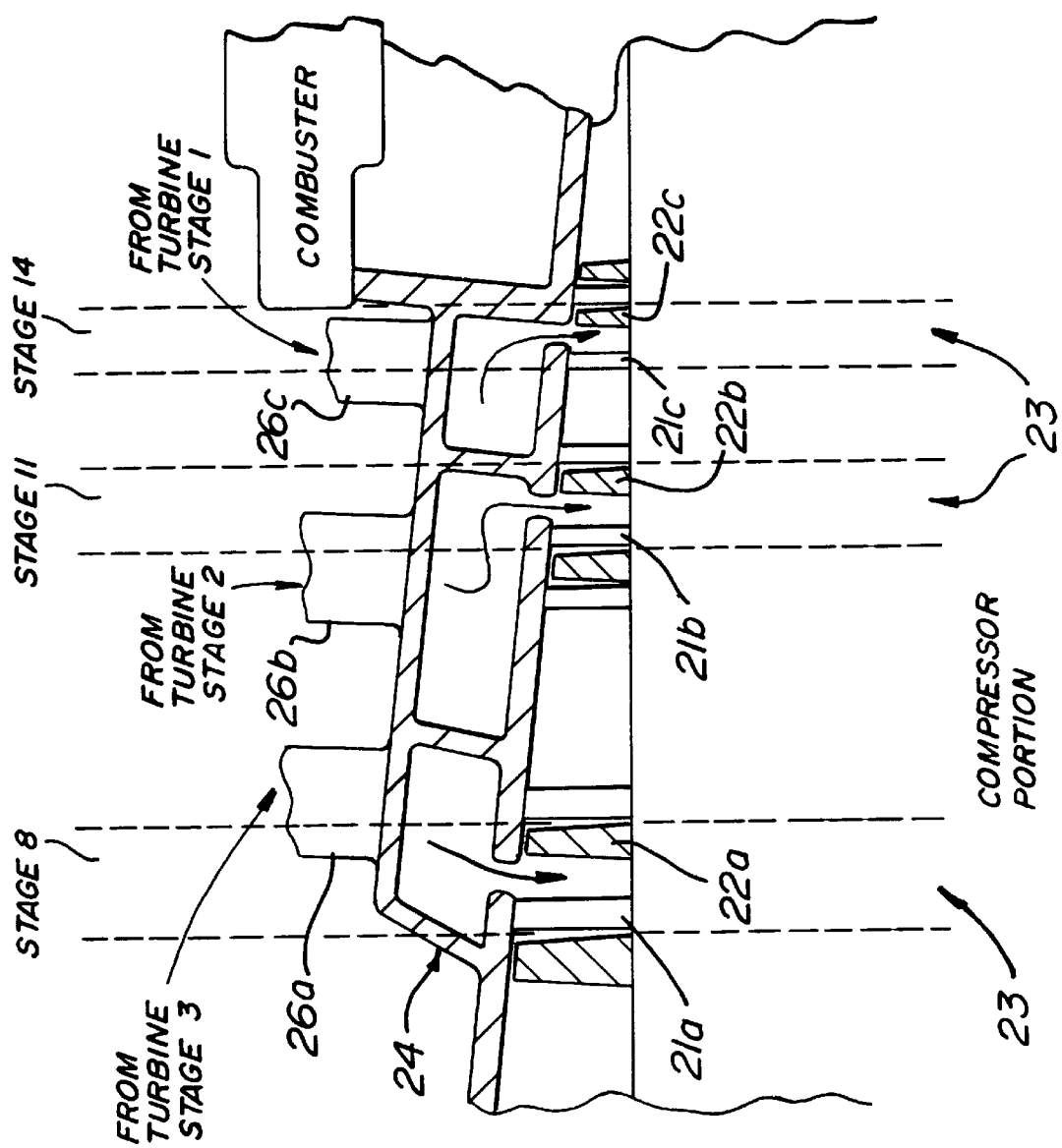
FIG. 3 is a sectional view of the injection path of the spent cooling air into the compressor stages.

FIG. 3 illustrates the presently preferred embodiment for the injection circuit of return air into the compressor 20. As shown, manifold 24 surrounds the compressor 20. Return air flows into the manifold 24 which is connected to conduits 26 via air inlets. For example, conduit 26a carries the airflow from stage three of turbine 30 into stage eight of the compressor 20. The injection stage will be selected such that the return air will have a pressure that substantially corresponds to the pressure of within the stage of the compressor 20 wherein it is injected. The return air will then combine with the air flow path through the compressor 20 and complete the turbine cycle.

The present invention may be embodied in other specific forms without departing from the spirit or essential attributes thereof; for example, a similar technique could be utilized to provide cooling to the blades rather than the vanes as depicted in the FIGURES. Accordingly, reference should be made to the appended claims, rather than to the foregoing specification, as indicating the scope of the invention.

What I claim is:

1. In a turbine engine having a multi-stage compressor and a multi-stage turbine, an apparatus for cooling the turbine, comprising:

first means for flow communication between a first stage of the compressor and a first stage of the turbine for bleeding pressurized air from the compressor into said first stage of the turbine, wherein said first stage of the compressor is a high pressure, down stream stage of the compressor;

second means for flow communication between said first stage of the turbine and a second stage of the compressor for returning a first portion of said pressurized air back to the compressor, wherein said second stage of the compressor is upstream and at a lower pressure than said first stage of the compressor; and third means for flow communication between said first stage of said turbine and a second stage of said turbine for providing a second portion of said pressurized air to said second stage of said turbine, wherein said second stage of the turbine interacts with a working gas at a lower pressure than said first stage of the turbine.

2. The apparatus as recited in claim 1 further comprising a cooling means disposed between the compressor and the turbine for cooling said pressurized air to a predetermined temperature.

3. The apparatus as recited in claim 1, further comprising fourth means connecting said second stage of said turbine and said compressor for returning at least part of said second portion of pressurized air to a third stage of said compressor, wherein said third stage of the compressor is upstream and at a lower pressure than said second stage of the compressor.

4. The apparatus as recited in claim 1 wherein said third means further comprises a cooling means.

5. The apparatus as recited in claim 4 wherein said cooling means comprises one of an air-to-air cooler, an air-to-steam cooler, and an air-to-water cooler.

6. The apparatus as recited in claim 3 further comprising a control valve in flow communication with said second means for regulating said first and said second portions of said pressurized air.

7. In a gas engine having a multi-stage compressor and a turbine having at least two stages each with a cooling circuit, a closed-loop cooling system for the turbine, comprising:

a first compressor cooling air outlet in flow communication with pressurized air generated by a first stage of the compressor, wherein said first stage of the compressor is a high pressure, down stream stage of the compressor;

a first turbine cooling circuit inlet in flow communication with the cooling circuit within a first stage of the turbine;

a first conduit in flow communication between said first compressor cooling air outlet and said first turbine cooling circuit inlet such that pressurized air is supplied to the turbine from the compressor;

a first turbine cooling circuit outlet in flow communication with the cooling circuit within the first stage of the turbine;

a first compressor return air inlet in flow communication with a second stage of the compressor, wherein the second stage of the compressor is upstream and at a lower pressure than said first stage of the compressor;

a second conduit in flow communication between said first turbine cooling circuit outlet and said first compressor return air inlet such that a first portion of said pressurized air is returned from the turbine to the compressor;

a second turbine cooling circuit inlet in flow communication with the cooling circuit within a second stage of the turbine, wherein the second stage of the turbine interacts with a working gas at a lower pressure than the first stage of the turbine; and a conduit coupled between said first turbine cooling circuit outlet and said second turbine cooling circuit inlet such that a second portion of said pressurized air flows into said second stage of the turbine.

8. The apparatus as recited in claim 7 further comprising a cooler disposed along said first conduit such that said pressurized air is cooled to a predetermined temperature before entering the cooling circuit within said first stage of the turbine.

9. The apparatus as recited in claim 8 wherein said cooler comprises one of an air-to-air cooler, and air-to-steam cooler, and air-to-water cooler.

10. The apparatus as recited in claim 7, further comprising:

a second turbine cooling circuit outlet in flow communication with said second turbine stage cooling circuit; and a conduit connecting said second turbine cooling circuit outlet and a third stage of said compressor for returning at least part of said second portion of pressurized air to said compressor.

11. The apparatus as recited in claim 10 further comprising a cooler disposed in said conduit between said first stage of the turbine and said second stage of the turbine such that said second portion of pressurized air is cooled to a predetermined temperature before flowing into said second stage of the turbine.

12. The apparatus as recited in claim 10 further comprising a control valve disposed between said turbine and said compressor and operable to regulate the amount of pressurized air in said first portion and said second portion of pressurized air.

13. In a gas turbine engine having at least two compressor stages and at least two turbine stages wherein each turbine stage has a plurality of parts to be cooled, a method for providing closed-loop air cooling to the plurality of parts in at least two of the turbine stages comprising:

bleeding pressurized air from a first of the two compressor stages, wherein the first stage is a down stream high pressure stage of the compressor;

routing said pressurized air into the plurality of parts in a first of the turbine stages;

routing said pressurized air out of the plurality of parts of said first turbine stage after said pressurized air has removed heat from said parts;

routing a first portion of said pressurized air into the plurality of parts in a second of the turbine stages, wherein the second of the turbine stages interacts with a working gas at a lower pressure than said first of the turbine stages; and returning a second portion of said pressurized air back to the compressor at a second of said compressor stages, wherein said second of the compressor stages is upstream and at a lower pressure than said first stage of the compressor.

14. The method as recited in claim 13 further comprising the step of cooling said pressurized air to a predetermined temperature after said bleeding step.

15. The method as recited in claim 13 further comprising the step of cooling said first portion of said pressurized air.

16. The method as recited in claim 14 further comprising the step of providing one of an air-to-air cooler, and air-to-steam cooler, and an air-to-water cooler for cooling said pressurized air.

17. The method as recited in claim 13 further comprising the step of providing a valve for portioning said pressurized air into said first and said second portions.

18. The method as recited in claim 17, further comprising the step of regulating said valve in response to one of a pressure and a temperature signal.

19. In a gas turbine engine having at least two compressor stages and at least two turbine stages wherein each turbine stage has a plurality of vanes, a method for providing closed-loop air cooling to the plurality of vanes in each turbine stage under normal turbine operating conditions, comprising;

bleeding pressurized air from one of the compressor stages into the plurality of vanes in one of the at least two turbine stages;

routing said pressurized air out of the plurality of vanes;

routing a first portion of said pressurized air into the plurality of vanes in an other one of the at least two turbine stages, wherein the second of the turbine stages interacts with a working gas at a lower pressure than said first of the turbine stages; and returning a second portion of said pressurized air back to the compressor at an other one of said at least two compressor stages, wherein the second of the compressor stages is upstream and at a lower pressure than the first of the compressor stages.

20. The apparatus as recited in claim 1 wherein the second stage of the compressor is selected to have a pressure substantially equal to the pressure of the first portion of the pressurized air returned from the first stage of the turbine.

* * * * *

UNITED STATES PATENT AND TRADEMARK OFFICE
CERTIFICATE OF CORRECTION

PATENT NO. : 6,098,395

DATED : August 8, 2000

INVENTOR(S) : WILLIAM EDWARD NORTH

It is certified that error appears in the above-identified patent and that said Letters Patent is hereby corrected as shown below:

Column 1, line 6, "Contract DE-AC21-94MC30247" should be:

-- Contract DE-AC21-93MC30247 --.

Signed and Sealed this

Eighth Day of May, 2001

Attest:

NICHOLAS P. GODICI

Attesting Officer    Acting Director of the United States Patent and Trademark Office